July 21, 1953  R. B. TAYLOR  2,646,540
MOTOR CONTROL SYSTEM
Filed May 15, 1951
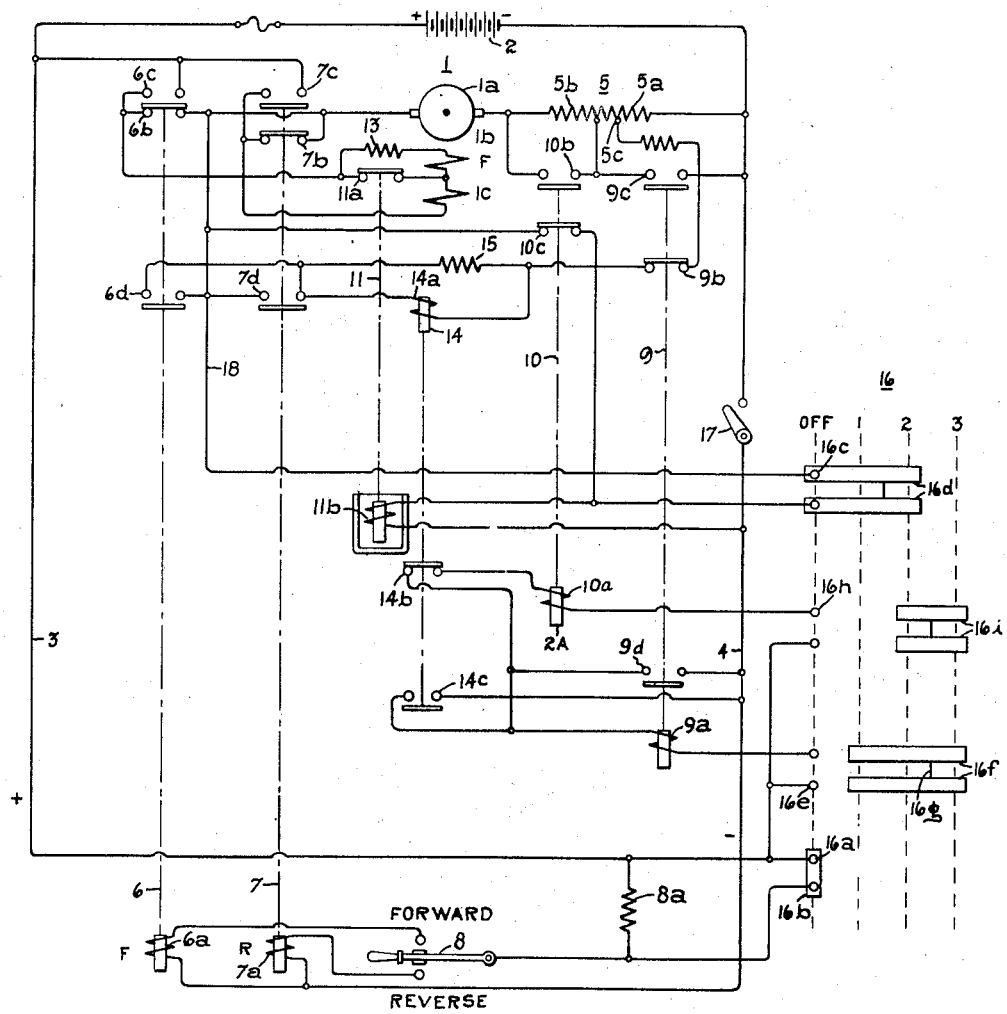
Inventor:
Robert B. Taylor,
by Claude A. Mott
His Attorney.

Patented July 21, 1953

2,646,540

UNITED STATES PATENT OFFICE 2,646,540

MOTOR CONTROL SYSTEM

Robert B. Taylor, Schenectady, N. Y., assignor to General Electric Company, a corporation of New York Application May 15, 1951, Serial No. 226,471

7 Claims. (Cl. 318—262)

1

This invention relates to control systems and more particularly to systems for controlling the starting, acceleration and reversal of electric motors, and it has for an object the provision of a simple, reliable, improved and inexpensive control system of this character.

More specifically, the invention relates to control systems and direct current electric motors in which the motor is subject to reversals by "plugging" operation. A motor is plugged when the armature is rotating in one direction and a voltage is applied which tends to cause the armature to rotate in the opposite direction. A direct current motor may be plugged by reversing the voltage applied either to the field or to the armature.

During the usual motoring operation the counter-voltage of the motor opposes the line voltage and limits motor current to a relatively low value. When the motor is plugged the polarity of the counter-voltage is reversed and adds to the line voltage. If the motor is plugged when operating at full speed the resulting voltage, i. e. the sum of the line voltage and the counter-voltage would be approximately double line voltage. This would cause a current to flow in the armature circuit equal to many times the full load current unless restricted by some current limiting means. Accordingly, a further object of this invention is the provision of means for limiting the current during plugging to a safe value.

In accelerating a motor from rest a plurality of accelerating contactors are provided for successively short-circuiting portions of a current limiting resistor in the armature circuit and a control device such as a time delay relay is utilized to interpose a predetermined interval of time between the sequential operations of the accelerating contactors.

A further and more specific object of the invention is the provision of a motor control system in which the number of parts required for accelerating and reversing the motor by plugging is reduced to a minimum.

In carrying the invention into effect in one form thereof, an electromagnetic relay is provided for interposing a predetermined interval of time between the sequential closings of the accelerating contactors. During reversal by plugging this timing relay serves to delay the beginning of the short-circuiting operations of the accelerating contactors to effect acceleration in the reverse direction until the additive polarity counter-voltage is reduced to a predetermined low value at which the short-circuiting of the current limiting resistor may be initiated without risk of damage to the motor.

For a better and more complete understanding of the invention, reference should now be had to the following specification and to the accompanying drawing of which the single figure is a simple diagrammatic sketch of an embodiment of the invention.

Referring now to the drawing, the invention is illustrated as embodied in a motor control system for an industrial battery operated truck in which the driving motor 1 is supplied from a conventional industrial type battery 2 the terminals of which are connected to energize the supply conductors 3 and 4 to which the motor is arranged to be connected through a current limiting accelerating resistor 5. Although the motor 1 may be of any suitable type, it is preferably a series wound motor having an armature member 1a and a series field winding that is divided into two portions 1b and 1c.

A pair of electromagnetically operated reversing contactors 6 and 7 which are under the control of a manually operated directional switch 8 serve to connect the motor to the supply conductors 3 and 4 for rotation in either direction.

A pair of electromagnetically operated accelerating contactors 9 and 10 are provided for successively short-circuiting the portions 5a and 5b of the accelerating resistor respectively. A third electromagnetically operated accelerating contactor 11 is provided with normally closed contacts 11a which serve to short-circuit the portion 1b of the series field winding of the motor through a resistor 13 to provide the final step of acceleration by field weakening.

Control relay 14 serves to interpose a predetermined interval of time between the closings of the accelerating contactors 9 and 10, during acceleration from rest and it also serves during reversal of the motor by plugging to prevent the operation of the accelerating contactors to short-circuit the current limiting resistance until the counter-voltage of the motor is reduced to a predetermined low value. The time delay in the operation of the control relay 14 may be affected by any suitable time delay means but is preferably affected by means of a discharge resistor 15 which is connected across the terminals of the operating coil 14a. When the coil 14a discharges through the resistor 15, the reduced rate of decay of the current produces a correspondingly reduced rate of decay of the flux of the magnetic circuit which maintains the relay in its picked-up position until the current has decayed to a predetermined low value.

The sequential operation of the accelerating contactors is under the control of a multi-position master switch 16 which as illustrated in the drawing has an off position and three speed positions. For truck service the master switch is preferably a foot operated device.

With the foregoing understanding of the elements and their organization in the system, the operation will readily be understood from the following detailed description. With the directional switch 8 and the master switch 16 in their off positions in which they are illustrated, the relays and contactors described in the foregoing are in the normal deenergized position in which they are illustrated in the drawing. To place the control in condition for operation, the key switch 17 is closed to energize the supply conductor 4.

If it is desired to cause the motor to rotate in the forward direction, the directional switch 8 is moved to its upper closed position in which an energizing circuit is completed for the operating coil of the forward directional contactor 6. This circuit is traced from the positive supply conductor 3 through the fingers 16a and the bridging member 16b of the master switch contacts of the directional switch 8, operating coil 6a of the forward directional contactor to the negative supply conductor 4. In response to energization the forward directional contactor picks-up and opens its normally closed contacts 6b and closes its normally open contacts 6c and 6d. Contacts 6c in closing connect the armature 1a of the motor across supply conductors 3 and 4 with the full amount of the accelerating resistor 5 in circuit. An energizing circuit is also completed for the operating coil 11b of accelerating contactor 11. This circuit is traced from the positive supply conductor 3 through contacts 6c of the forward contactor, normally closed contacts 11a of the contactor 11, portion 1c of the motor series field winding, normally closed contacts 7b of the reverse contactor, conductor 18, fingers 16c of the master switch (connected together by strap 16d) operating coil 11b of the contactor 11 to the negative supply conductor 4. In response, contactor 11 picks-up and opens its normally closed contacts 11a to insert the section 1b of the series field winding in circuit with the section 1c. As a result of the excitation of both sections 1b and 1c of the series field winding, the acceleration of the motor is initiated with full field so that the motor developes its maximum starting torque. Since the motor has full field strength and the full amount of accelerating resistor is in circuit with the motor, it accelerates from rest to a low speed.

Simultaneously, with the closing of the forward contactor an energizing circuit is completed for the operating coil 14a of the control relay which is traced from the positive supply conductor 3 through main contacts 6c of the forward contactor, the resistor 13 and series field winding 1b, 1c, normally closed contacts 7b of the reverse contactor, contacts 6d of the forward contactor (closed in response to picking-up of the forward contactor), operating coil 14a, normally closed contacts 9b of the accelerating contactor, right hand portion of accelerating resistor 5a to the negative supply conductor 4. It will be noted that the coil of the relay 14 is connected from the left hand armature terminal of motor 1 to an intermediate point 5c on the accelerating resistor. Thus, it is responsive to the motor voltage plus the voltage drop across the portion of the accelerating resistor between the right hand armature terminal and the intermediate point 5c. Responsively to energization relay 14 picks-up and opens its normally closed contacts 14b and closes its normally open contacts 14c. The opening of contacts 14b interrupts the energizing circuit for the operating coil 10a of the accelerating contactor 10. The result of this interruption of the energizing circuit of contactor 10 is to prevent its being picked-up by operation of the master switch 16 until the control relay 14 is subsequently deenergized and dropped out.

Usually, after closing the manually operated directional switch 8, the operator operates the master switch from the off position through the first and second speed positions to the third speed position in a single movement and as rapidly as it is possible for him to do so. As the master switch leaves the off position the bridging member 16b is moved out of engagement with the fingers 16a thereby interrupting the energizing circuit previously traced for the forward contactor. However, the forward contactor remains picked-up owing to a by-pass circuit through a resistor 8a which reduces the current through the coil 6a to a value insufficient to pick-up the contactor, but sufficient to hold it in once it has been picked-up. Contacts 14c in the closed position completes an energizing circuit for the operating coil 9a of the accelerating contactor 9. This circuit is traced from the positive supply conductor 3 through the fingers 16e of the master switch bridged by segments 16f and strap 16g, operating coil 9a and contacts 14c to the negative supply conductor 4. Contactor 9 picks-up in response to energization and closes its normally open contacts 9c and 9d and opens its normally closed contacts 9b. Contacts 9c in closing short-circuit the section 5a of the accelerating resistor thereby causing the motor to accelerate to a higher speed. Contacts 9d in closing complete a sealing-in circuit for contactor 9 independent of the contacts 14c of the control relay so that contactor 9 will remain picked-up after the control relay is subsequently dropped out. The opening of contacts 9b interrupts the energizing circuit for the operating coil 14a. Following the disconnection of the coil 14a from the source the coil discharges into the discharge resistor 15. This discharge current decays at an exponential rate and after an interval of time that is determined by inductance of the coil 14a and the resistance of resistor 15 the magneto motive force of the magnetic circuit of relay 14 decays to such a low value that the relay drops out and closes its normally closed contacts 14b and opens its normally open contacts 14c. As previously pointed out, the opening of contacts 14c does not drop out the contactor 9 which is sealed in through its interlock contacts 9d. However, the closing of contacts 14b completes an energizing circuit for the operating coil 10a of the accelerating contactor 10. This circuit is traced from the positive supply conductor 3 through fingers 16h and cooperating segments 16i of the master switch, operating coil 10a normally closed contacts 14b, and interlock contacts 9d to the negative supply conductor 4. In response to energization, accelerating contactor 10 picks-up and closes its normally open main contacts 10b to short-circuit the final section 5b of the accelerating resistor, thereby to accelerate the motor to an intermediate speed. It is to be noted that the control relay 14 has performed one of its functions, i. e. the interposition of a time delay between the closing of the accelerating contactor 9 and the accelerating contactor 10.

When the master switch passed from the second position to the third position, it interrupted the energizing circuit for the operating coil of accelerating contactor 11 which was previously traced through fingers 16c and segments 16d. However, the coil 11b remains energized by means of a by-pass circuit through normally closed contacts 10c of the accelerating contactor 10 until the latter is picked-up. When contactor 10 picks-up to short-circuit the final portion of the accelerating resistor, contacts 10c open to interrupt the by-pass circuit and drop out contactor 11. In the dropped out position of contactor 11, normally closed contactors 11a short-circuit the section 1b of the motor series field winding thereby to weaken the field and to accelerate the motor to full speed.

If while the motor is operating at full speed in the forward direction it is desired to operate the motor at full speed in the reverse direction the operator must return the master switch 16 to the off position and move the manually operated directional switch from the forward position to the reverse position. Reversal of the motor cannot be accomplished simply by movement of the directional switch to the reverse position without moving the master switch to its off position because with the master switch in a running position, an energizing circuit for the operating coil of the reverse directional contactor can be completed only through the resistor 8a which limits the current in the circuit to a value that is insufficient to pick-up the contactor. However, with the master switch in the off position the resistor 8a is short-circuited by the bridging member 16b thereby permitting sufficient current to flow in the energizing circuit to pick-up the contactor.

The most rapid reversal of the motor is effected by manipulating the directional switch 8 and the master switch 16 so that the directional switch closes its reverse contact and the master switch simultaneously reaches the off position, and then returning the master switch as rapidly as possible to its third or full speed running position.

As the master switch is returned through the running positions to its off position, the contactors 9 and 10 are dropped-out and both sections 5a and 5b of the accelerating resistor are reinserted in the armature circuit with the result that the contactors and relays are restored to the normal deenergized positions in which they are illustrated in the drawing. The movement of the directional switch 8 out of engagement with its forward contact drops out the forward contactor, and its movement into engagement with its reverse contact completes an energizing circuit for the operating coil 7a of the reverse contactor which picks-up and completes the connection of the motor through the main contacts 7c to the positive supply conductor 3. The dropping out of the forward contactor deenergizes and drops out the relay 14. At this instant the motor is still rotating at full speed in the forward direction. Current now flows in the opposite direction through the series field winding with the result that the polarity of the counter-voltage of the motor is reversed and adds to the line voltage. In the picked-up position of the reverse directional contactor the energizing circuit for the contactor 11 is reestablished. The circuit is traced from the positive supply conductor 3, through contacts 7c of the reverse contactor, section 1c of the motor field winding and thence through the contacts 11a and also through section 1b of the field winding and resistor 13 in parallel with contacts 11a through normally closed contacts 6b of the forward contactor, contacts 10c of the accelerating contactor 10, operating coil 11b to the negative supply conductor. Contactor 11 picks-up and removes the short-circuit from the section 1b of the series field winding with the result that full field strength of the motor is established with the motor still operating at substantially full speed in the forward direction. At this point the counter-voltage is substantially equal to the line voltage and since it adds to the line voltage, substantially double line voltage is applied across the current limiting resistor 5. If it were possible for the control to short-circuit the resistor 5 at this instant, the current in the armature circuit would rise to many times the maximum permissible value with the result of damage to the insulation.

This undesirable condition is, however, prevented by the control relay 14. As previously pointed out, the operating coil of this control relay is connected from the left hand armature terminal to an intermeidate point 5c on the accelerating resistor in response to closing of either of the directional contactors. Since the voltage drop across the resistor opposes the additive line voltage and countervoltage, the voltage of the point 5c which is approximately the mid-point of resistor 5 is substantially equal to the voltage of the left hand armature terminal. The result is that substantially zero voltage is applied across the terminals of the coil 14a of the control relay. Consequently, a very small current flows in its coil circuit which is insufficient to pick-up the relay and as long as the relay remains dropped out the accelerating contactors 9 and 10 cannot be energized and picked-up.

The large current which flows in the armature circuit as the result of the application of double line voltage across the accelerating resistor produces a powerful braking torque which rapidly brakes the motor to rest. As the speed and counter-voltage of the motor decrease a voltage difference appears between the left hand armature terminal and interemdiate point 5c on the resistor. At a predetermined low speed of the motor the counter-voltage is reduced to such a low value that substantially only line voltage is applied across the resistor. Under this condition, the short-circuiting of the resistor to accelerate the motor in the reverse direction may be safely initiated. At this predetermined low speed the difference voltage between the left hand armature terminal and the point 5c attains a value which causes sufficient current to flow in the operating coil 14a to pick-up the control relay and initiate the closing of the accelerating contactors 9 and 10. From this point the acceleration proceeds in the manner already described in relation to the acceleration in the forward direction.

Thus, it will be noted that in addition to interposing a time delay between the successive closings of the accelerating contactors 9 and 10 during acceleration of the motor in either direction, the control relay performs the additional function during reversal of preventing the closing of the accelerating contactors until the counter-voltage of the motor has decreased to predetermined low value at which it is safe to begin short-circuiting the accelerating resistor.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination a pair of supply conductors, a direct current electric motor, a directional switch having forward and reverse operating positions, forward and reverse directional contactors selectively operable in response to selective operation of said directional switch to said operating positions to connect said motor to said supply conductors for rotation in a selected direction, a current limiting resistor connected in the armature circuit, first and second accelerating contactors for sequentially rendering portions of said resistor ineffective, a relay responsive to the voltage drop across a portion of said armature circuit during starting of said motor for effecting operation of said first accelerating contactor and subsequent operation of said second accelerating contactor and responsive to the reverse polarity counter-voltage of said motor for delaying the operation of said first accelerating contactor until the speed of said motor is decreased to a predetermined low value in response to operation of said directional switch from one of said operating positions to the other to effect reversal of said motor and a time delay device on said relay responsive to operation of said first accelerating contactor for interposing a predetermined time interval between the sequential operations of said first and second contactors.

2. A control system comprising in combination a pair of supply conductors, a direct current electric motor, a directional switch having forward and reverse operating positions, forward and reverse directional contactors selectively operable in response to selective operation of said directional switch to said operating positions to connect said motor to said supply conductors for rotation in a selected direction, a current limiting resistor connected in the armature circuit, first and second accelerating contactors for sequentially rendering portions of said resistor ineffective, a relay having an armature operated to a first position in response to the voltage drop across a portion of said armature circuit for effecting operation of said first accelerating contactor and operable to a second position in response to said operation of said first accelerating contactor to effect operation of said second accelerating contactor, and operated to said first position in response to the combined reverse polarity counter-voltage of said motor and voltage drop across said resistor at a predetermined low speed of said motor produced during deceleration in response to operation of said directional switch from one of said operating positions to the other to reverse said motor, and a time delay device on said relay responsive to operation of said first accelerating contactor for interposing a predetermined time interval between the operations of said relay armature to said first and second positions.

3. A control system comprising in combination a pair of supply conductors, a direct current electric motor, a directional switch having forward and reverse operating positions, forward and reverse directional contactors selectively operable in response to selective operation of said directional switch to said operating positions to connect said motor to said supply conductors for rotation in a selected direction, a current limiting resistor connected in the armature circuit of said motor, first and second accelerating contactors for sequentially rendering portions of said resistor ineffective and a relay having an operating coil energized in response to the voltage drop across a portion of said armature circuit for effecting operation of said first accelerating contactor and responsive to operation of said first accelerating contactor for effecting operation of said second accelerating contactor and responsive to the reverse polarity counter-voltage of said motor to delay the closing of said first accelerating contactor until the speed of said motor is decreased to a predetermined low value in response to operation of said directional switch from one of said operating positions to the other to reverse said motor and responsive to the voltage across said portion of said circuit at said low speed for effecting operation of said first accelerating contactor.

4. A control system comprising in combination a pair of supply conductors, a direct current electric motor, a directional switch having forward and reverse operating positions, forward and reverse directional contactors selectively operable in response to selective operation of said directional switch to said operating positions to connect said motor to said supply conductors for rotation in a selected direction, a current limiting resistor connected in the armature circuit of said motor, first and second accelerating contactors, a multi-position master switch for providing sequential operation of said accelerating contactors for sequentially rendering portions of said resistor ineffective, and a relay having an operating coil energized by the voltage drop across said armature and a portion of said resistor for interposing a predetermined time delay between the operations of said first and second accelerating contactors and responsive to the reverse polarity counter-voltage of said motor to delay the closing of said first accelerating contactor until the counter-voltage of said motor is decreased to a predetermined low value in response to operation of said directional switch from one of said operating positions to the other to reverse said motor.

5. A control system comprising in combination a pair of supply conductors, a direct current electric motor, a directional switch having forward and reverse operating positions, forward and reverse directional contactors selectively operable in response to selective operation of said directional switch to said operating positions to connect said motor to said supply conductors for rotation in a selected direction, a current limiting resistor connected in the armature circuit of said motor, first and second accelerating contactors for sequentially rendering portions of said resistor ineffective and a relay having an operating coil connected to be energized by the voltage drop across the armature of said motor and a first portion of said resistor and having an armature picked-up in response to energization to effect operation of said first accelerating contactor to render a portion of said resistor ineffective and dropped out in response to deenergization to effect operation of said second accelerating contactor to render a second portion of said resistor ineffective, an auxiliary contact on said first accelerating contactor opened in response to said operation of said first accelerating contactor for interrupting the energizing circuit of said relay, a discharge resistor connected across said relay operating coil for interposing a predetermined interval of time between said operation of said first accelerating contactor and the drop out of said relay, said relay being responsive to the combined reverse polarity counter-voltage of said motor and the voltage drop across said first portion of said resistor for delaying the pick-up of said relay until the speed of said motor is decreased to a predetermined low value in response to operation of said directional switch from one of said operating positions to the other to reverse said motor.

6. A control system comprising in combination a pair of direct current supply conductors, an electric motor, a pair of directional contactors for connecting said motor to said source for rotation in either direction, a current limiting resistor connected in the armature circuit of said motor, first and second accelerating contactors for rendering corresponding sections of said resistor ineffective, a directional switch for producing selective operation of said directional contactors to connect said motor to said supply conductors for rotation in a selected direction, a master switch for controlling the operation of said first accelerating contactor and the subsequent operation of said second accelerating contactor to render said portions of said resistor ineffective, and a relay responsive to the voltage drop across the armature of said motor and a selected portion of said resistor for interposing a time delay between the operations of said first and second accelerating contactors during acceleration, and responsive to the voltage drop across said selected portion of said resistor and the reverse polarity counter-voltage of said motor during the deceleration portion of the reversal of said motor in response to operation of said directional switch to delay the operation of said first directional contactor to render its corresponding section of said resistor ineffective until the speed of said motor attains a predetermined low value.

7. A control system comprising in combination a pair of supply conductors, a direct current motor, a directional switch, a forward directional contactor operable in response to operation of said directional switch to a first position to connect said motor to said source for rotation in the forward direction, a current limiting resistor in circuit with said armature, a relay having an operating coil connected across the armature of said motor and a portion of said resistor for energization in response to operation of said contactor and having a first contact operated in response to energization, a first accelerating contactor closed in response to operation of said contact for short-circuiting a portion of said resistor and for interrupting the energizing circuit of said relay, a discharge resistor connected across said relay coil for delaying the drop out of said relay for a predetermined interval of time, a second contact on said relay closed in response to deenergization of said relay, a second accelerating contactor closed in response to closing of said second contact to short-circuit a second portion of said resistor, a master switch for opening said accelerating contactors to reinsert the short-circuited portions of said resistor in said armature circuit, said forward directional contactor being opened in response to opening of said directional switch to interrupt the connections of said motor to said supply conductors and to interrupt the energizing circuit of said relay coil, and a reverse directional contactor responsive to operation of said directional switch to a second position to connect said motor to said supply conductors with the polarity of the counter-voltage reversed with respect to the voltage of said supply conductors for rotation in the reverse direction and for connecting said relay coil across a portion of said resistor and said armature, said reverse polarity combining with said supply voltage to maintain said relay deenergized until the speed of said motor is reduced to a predetermined low value.

ROBERT B. TAYLOR.

References Cited in the file of this patent
UNITED STATES PATENTS

| Number | Name | Date |
|---|---|---|
| 1,802,765 | James | Apr. 28, 1931 |
| 1,847,081 | Cook | Mar. 1, 1932 |